United States Patent [19]

Harper et al.

[11] Patent Number: 4,636,634
[45] Date of Patent: Jan. 13, 1987

[54] APPARATUS WITH INTELLIGENT BINS INDICATING THE PRESENCE AND IDENTITY OF STORED CODED ARTICLES

[75] Inventors: James G. Harper; Louis G. Bailey, both of Dallas, Tex.

[73] Assignee: Veeco Integrated Automation, Inc., Dallas, Tex.

[21] Appl. No.: 645,162

[22] Filed: Aug. 28, 1984

[51] Int. Cl.[4] .............................................. G01N 9/04
[52] U.S. Cl. ................................ 250/223 R; 250/568; 235/462; 235/385
[58] Field of Search ................................ 364/478, 403; 250/223 R, 566, 222.1, 568, 221, 569; 235/462, 385, 438; 414/730; 901/47

[56] References Cited

U.S. PATENT DOCUMENTS

| | | | |
|---|---|---|---|
| 3,426,326 | 2/1969 | Goldstein | 235/385 |
| 3,519,832 | 7/1970 | Castaldi | 250/568 |
| 3,852,572 | 12/1974 | Nicoud | 250/569 |
| 4,010,355 | 3/1977 | Roehrman et al. | 235/462 |
| 4,029,957 | 6/1977 | Betz et al. | 250/222.1 |
| 4,181,948 | 1/1980 | Jackson et al. | 364/478 |
| 4,278,968 | 7/1981 | Arnett et al. | 250/222.1 |

OTHER PUBLICATIONS

Hess, P. E., "System for Data Carrier Protection", *IBM Technical Disclosure Bulletin*, vol. 17, No. 5, pp. 1398-1399.

*Primary Examiner*—David C. Nelms
*Assistant Examiner*—Michael Messinger
*Attorney, Agent, or Firm*—Morgan & Finnegan

[57] ABSTRACT

In an apparatus for storing articles, bins have a sensor for detecting the presence of an article in a bin and an optical code reader for reading a bar code on the article. The presence detector and the optical code reader are coupled to a circuit which provides an indication of the identity and location of a coded article. The apparatus is particularly well suited for use in the manufacture of semiconductor devices, when wafer cassette boxes are provided with a suitable bar code. Alternatively, the bins may be disposed upon a remotely guided vehicle, thereby making the apparatus useful in an automated manufacturing process.

17 Claims, 8 Drawing Figures

APPARATUS WITH INTELLIGENT BINS INDICATING THE PRESENCE AND IDENTITY OF STORED CODED ARTICLES

BACKGROUND OF THE INVENTION

1. Field of the Invention

The apparatus of the present invention relates generally to bins for storing articles, and more specifically to an intelligent bin in which the stored articles can be identified during a manufacturing process such as the manufacturing of semiconductors.

2. Description of the Prior Art

Semiconductor wafers are typically processed in batches of twenty five or fifty. These wafers are held in cassettes in groups of twenty five between processing steps. In order to maintain cleanliness, these cassettes may be placed in a cassette box. These cassette boxes are typically made of plastic, and may have latches to close the lid. The cassette boxes may also hold one or two cassettes.

A major problem in the manufacturing of integrated circuits or semiconductor wafers is the lack of knowledge concerning position of inventory in the manufacturing process. Typically, a piece of paper is taped to a cassette box with the identity and progress through the process indicated on the paper. However, the actual physical position of the cassette box is unknown. The box may be on a table, or in a rack, or stacked on the floor. If it is needed, a person is required to go and look for the box. It is possible that several hundred boxes are in process at the same time, thus positive control and location identification are missing.

Accordingly, there is a need for an intelligent bin which can identify an article such as a cassette box and provide an indication of its location.

SUMMARY OF THE INVENTION

The apparatus of the present invention relates to an intelligent bin which can identify a stored article such as a cassette wafer box and provide an indication of its identity and location. The intelligent bin includes a mechanical structure, a presence detector and a code reader. A collection of bins can be grouped together to perform in process storage during a manufacturing process. The presence detector is preferably a photoelectric device which provides an indication that an article is located within a particular bin. The presence detector may also be of a magnetic or electrical type. The code reader which is preferably an optical code reader, can interpret a bar code or some other suitable code disposed upon the stored article. Other code reading methods which could be mechanical or electrical could be employed. Alternatively, the presence detector function could be incorporated into the bar code reader. An electronic circuit is coupled to the presence detector and the code reader to provide an indication of both the identity and location of a stored article.

DETAILED DESCRIPTION OF THE INVENTION

Figure 1:
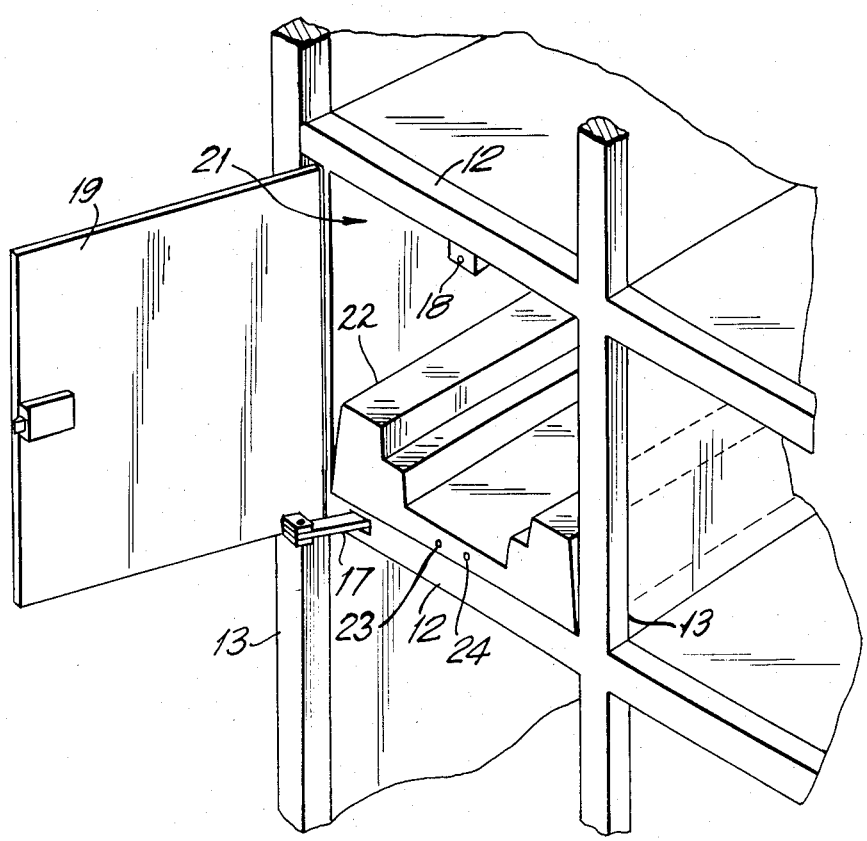
FIG. 1 is a perspective view of the intelligent bin of the present invention.

Referring now to FIG. 1, a perspective view of the intelligent bin 21 of the present invention is provided. The intelligent bin 21 is formed between horizontal sheet metal dividers 12 and vertical sheet metal dividers 13. A tray 22 is preferably disposed within the intelligent bin 21 to provide a support for a coded article which may be placed within the intelligent bin.

The bin 21 may be open on both ends to allow the insertion of articles into the bins from either side. In applications where a difference in room pressure on either side of the bin is a significant factor, for example in the manufacture of semiconductor devices, a door 19 or doors can be provided on either side of the intelligent bin 21. Preferably, the door 19 includes a solenoid activated arm 17 and sensors 18 to indicate whether the door is closed or open.

Within each bin 21 there is a tray 22 for holding an article or cassette wafer box. On each tray 22, there are a pair of light emitting diodes 23, 24. Preferably, the LED 23 is green and the LED 24 is red. The LED's 23, 24 provide an operator with a visual indication. The illumination of the green LED 23 indicates that a bin can be utilized. The illumination of the red LED 24 indicates that there is a fault associated with the bin, e.g., the wrong article has been removed.

Figure 2:
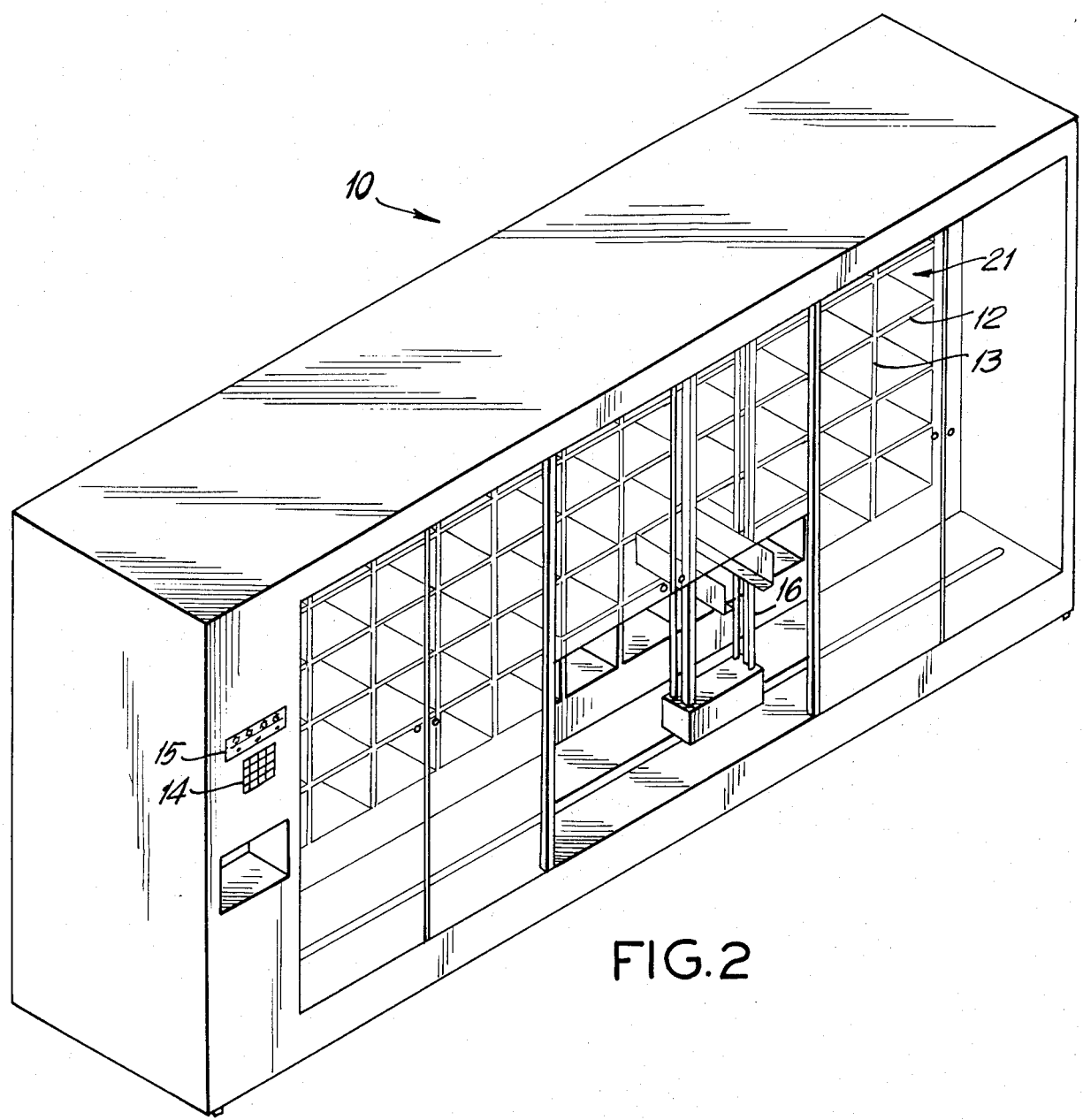
FIG. 2 is a perspective view of a collection of bins in a fixed storage station combined with a robotic arm.

Referring now to FIG. 2, a perspective view of a collection 10 of intelligent bins 21 is provided. A plurality of intelligent bins 21 are formed by horizontal sheet metal dividers 12 and vertical sheet metal dividers 13. Preferably, the bins 21 can be modularized in groups, thereby allowing for the expansion of the collection 10 of intelligent bins 21 when additional bins are required for a particular application.

The collection 10 of intelligent bins 21 may also include a display 15 and a keyboard 14 to allow an operator to enter data into a host computer when the collection 10 of intelligent bins 21 is linked to an automated system. An article retrieval device 16 utilizing electric servomotors may also be attached to the collection 10 of intelligent bins 21 when it is linked to an automated system.

Figure 3:
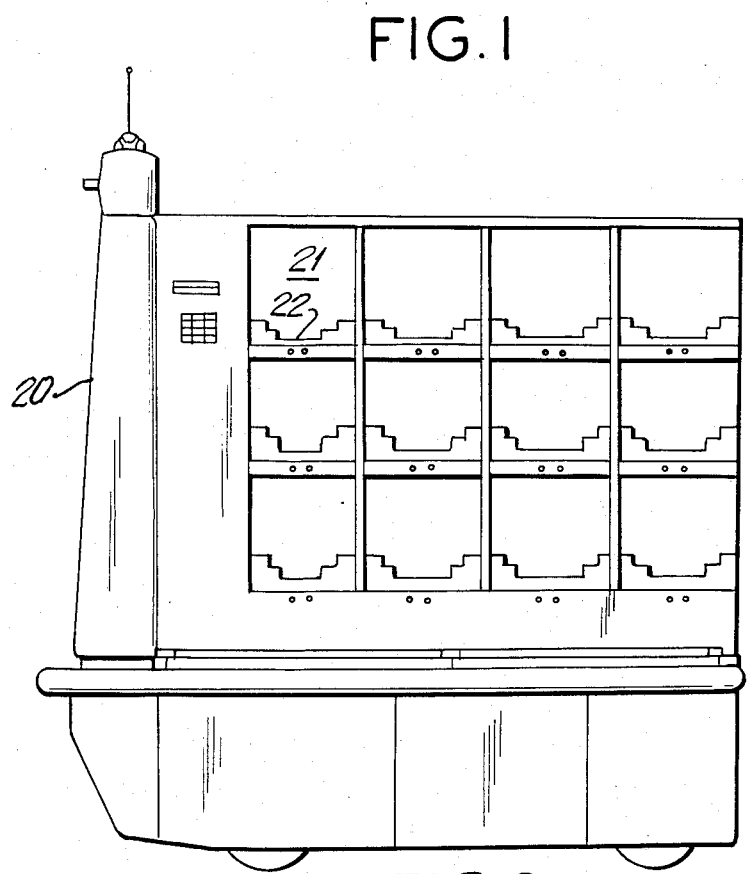
FIG. 3 is a side view of the intelligent bins disposed upon a remotely controlled vehicle.

Referring to now to FIG. 3, an alternate embodiment of a collection of intelligent bins 21 mounted on a remotely controlled vehicle 20 is provided. The remotely controlled vehicle 20 is of a type well known in the art and is generally described in U.S. Pat. Nos. 3,935,922 3,970,840, 4,003,445, 4,003,445, 4,020,918, 4,034,823, 4,307,791, 4,341,985, 4,379,497, and 4,397,372. The remotely controlled vehicle 20 may be modified to overcome some of the shortcomings associated with the radio frequency communication link described in the above listed patents.

Figure 4:
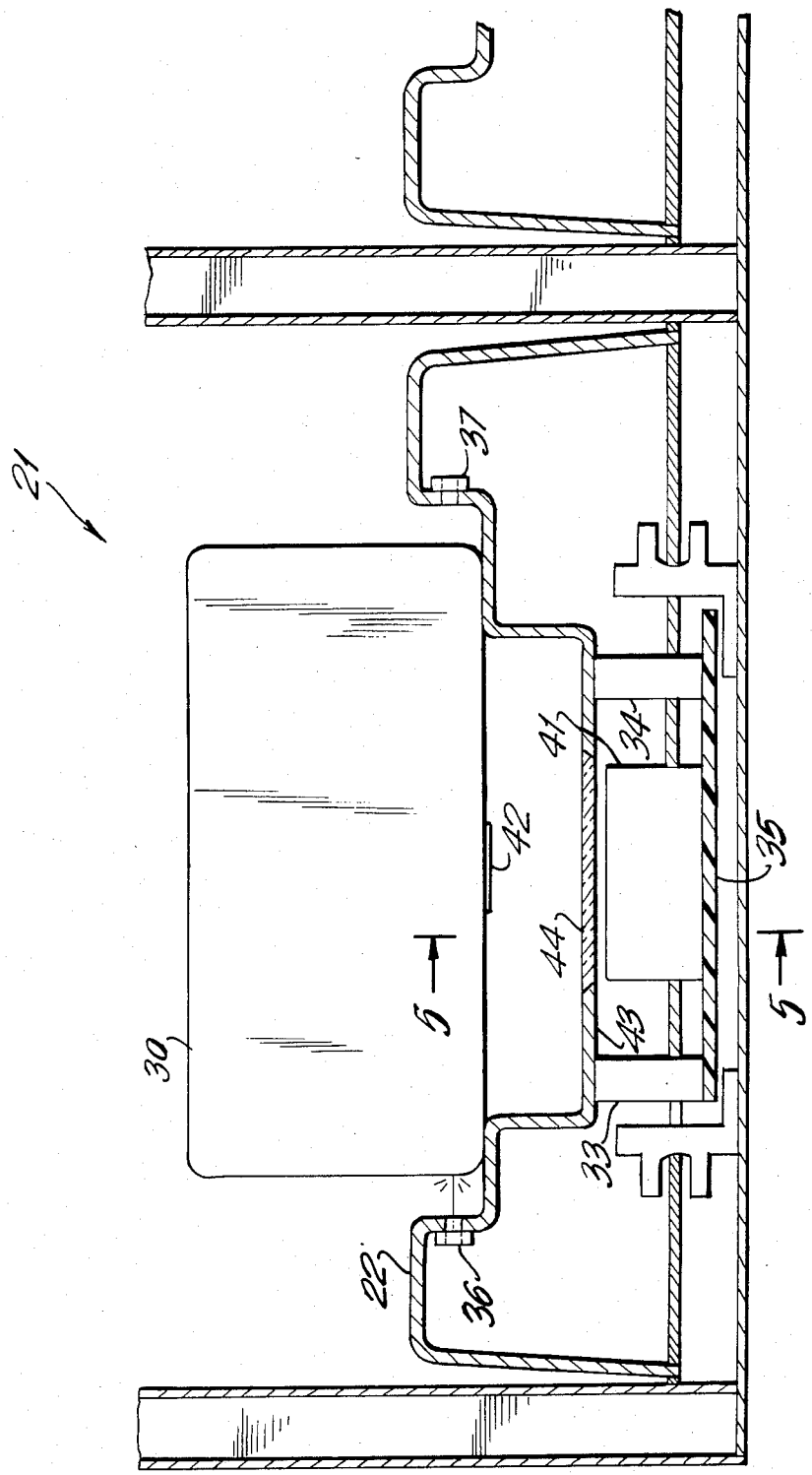
FIG. 4 is a partial cross sectional view of an article and a tray disposed within a bin.

Referring now to FIG. 4, there is an illustration in partial cross section of an article 30 disposed within the bin 21. The article 30 which may be a wafer cassette box is shown disposed upon the tray 22 which may be fabricated from sheet metal, plastic or some other suitable material. The tray 22 is preferably mounted on the mechanical structure of the bin 21 or collections of bins 21 and may be removed from the bin 21 for servicing. The bin 21 further includes a light source 36 which is preferably an LED and a photodetector 37 mounted on the vertical walls of the tray 22. The light source 36 and photodetector 37 can detect whether an article 30 is located within the bin 21, when a beam of light is interrupted. Brackets 33, 34 extend from the tray 22 and are connected to a printed circuit board 35 which contains an electronic circuit for the bin 21. In addition to the electronics mounted on the printed circuit board 35, there is an optical code reader disposed in a housing 41.

The optical code reader is capable of reading a bar code 42 disposed upon the bottom surface of the article 30. Illumination from the optical code reader passes through a glass plate 44 disposed in the tray 22 above the optical code reader. The glass plate 44 is for the protection of the printed circuit board 35.

Figure 5:
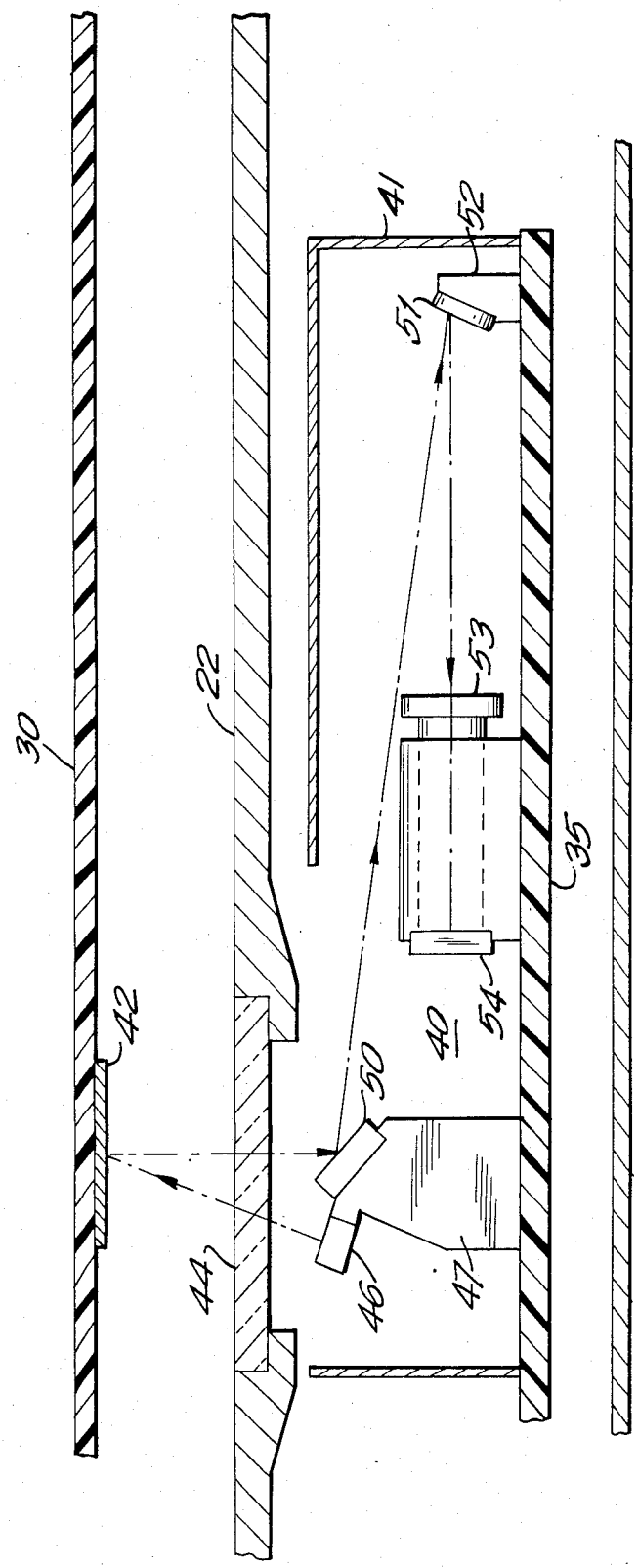
FIG. 5 is a cross sectional view taken along line 5—5 of FIG. 4, illustrating the mechanical details of an optical bar code reader and its optical path.

Referring now to FIG. 5, a partial cross sectional view taken along line 5—5 of FIG. 4 is provided, FIG. 5 illustrates the details of the optical code reader 40 which is located on the printed circuit board 35. The optical code reader 40 includes a light source 46 which is preferably a plurality of LED's and which is mounted on a base 47. Light from the light source 46 passes through the glass plate 44 disposed in the bottom of tray 22 and illuminates the bar code 42 on the bottom of article 30. A first mirror 50 which is also mounted on the base 47 reflects the image of the bar code 42 to a second mirror 51 which is mounted on a base 52. A lens assembly 53 focuses the image from mirror 51 on to a detector 54 which is preferably a CCD (charged coupled device) such as the commercially procurable CCD 112 sold by Fairchild Semiconductor Corp.

Figure 7:
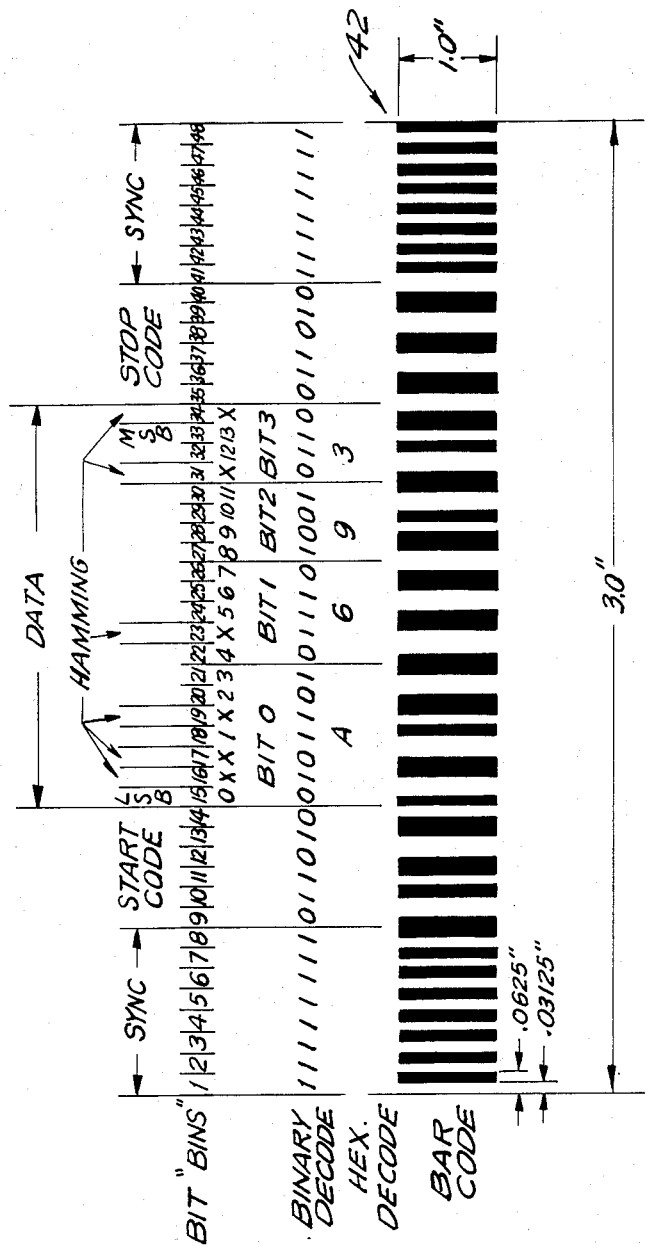
FIG. 7 is an illustration of a bar code adaptable for use with the present invention.

Referring now to FIG. 7, an illustration of a bar code 42 adaptable for use with the bar code reader 40 of the present invention is provided. In the normal state, the illumination for the bar reader 40 is disabled, and the bar code 42 is not illuminated. Once the bar code 42 is illuminated, the bin electronics which are also located on the printed circuit board 35 can output a black/white decision for each photoelement of the CCD array 54 which is responsive to the bar code 42. This information can be transmitted upon request to a module control board. The module control board can control the various electronic components on the printed circuit board 35 and associated with the intelligent bin 21. The module control board may preferably be comprised of a suitably programmed and commercially available microprocessor, memory elements, a multibus interface, line drivers and line receivers. The module control board can be linked to a host computer when the bins 21 are part of an automated system. The black/white decisions may be stored on this interface or module control board in a RAM buffer. The microprocessor of the module control board may then provide information to the automated system.

The bar code reader 40 is designed to read the image of the bar code 42 on the article 30 after it comes to rest in the bin 21. The image is actually sensed in the CCD array 54, since the CCD array 54 monitors light patterns returning from the read area. Thus the CCD array 54 accumulates the light energy returning from the active read area. When the software associated with the microprocessor on the module control board requests a read operation, the output of the CCD 54 is then made available.

It should be pointed out that the bar code reader 40 is normally in a quiescent state in which the illumination or LED's 46 are not activated. When a request to read a particular bin 21 is received from software, the first operation that is performed is to activate the illumination or LED's 46 After a time delay, the software sends a request to read and the image of bar code 42 may be captured and transmitted to the microprocessor. The LED's 46 may then be turned off.

Figure 6:
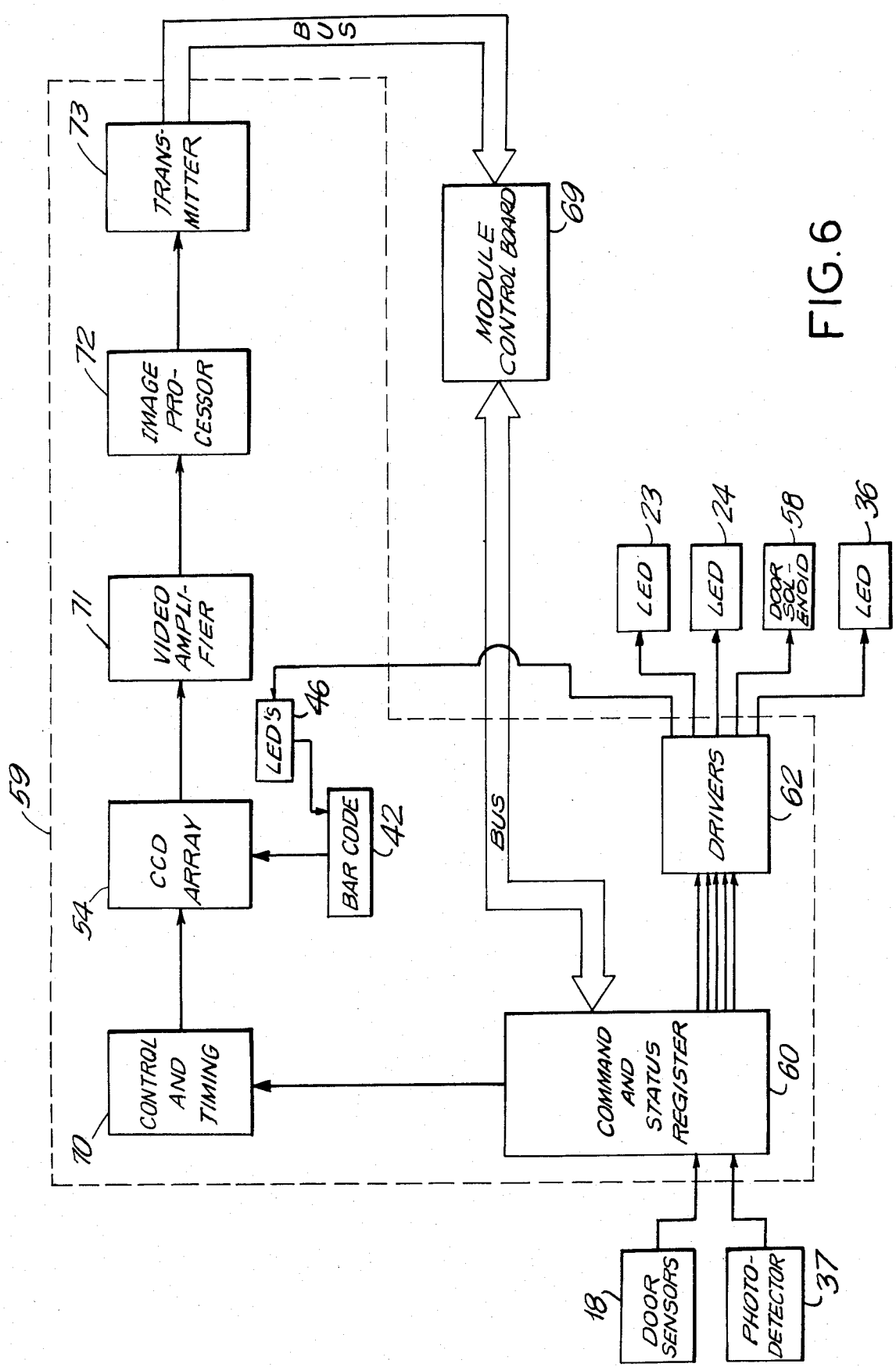
FIG. 6 is a schematic block diagram of the electronic processing circuit associated with the present invention.

Referring to FIG. 6, a schematic block diagram of the bin electronics 59 for a single bin 21 is provided. For a collection of bins there is a single printed circuit board 35 and bin electronics 59 for each bin 21. The module control board 69 selects specific bin electronics 59 from a collection of bins 21. There is a module control board 69 for each predetermined module or collection of bins 21. The bin electronics 59 receives all commands via a control bus and a command and status register 60. The command and status register 60 is coupled to a control and timing circuit 70 for the CCD array 54 allowing the CCD array 54 to be controlled by the microprocessor on the module control board 69. The CCD array 54 reads the bar code 42 and its output is amplified by a video amplifier 71. The output of the video amplifier is applied to an image processing circuit 72. The image processing circuit 72 performs a level detecting function for converting the analog output of the CCD array 54 into a black/white digital output which is applied to a transmitter 73. The transmitter 73 is comprised of line drivers which transmit the output of the CCD array 54 to the module control board 69. The module control board 69 sends commands to the bin electronics 59 upon the appropriate request from software. The module control board 69 is responsible for selecting the correct bin electronics 59. Within the group of bin electronics 59, selection is accomplished by decoding an address. All bin electronics 59 within a module or collection of bins 21 receive control words from the control bus but no operation is allowed within the bin electronics 59 if its address is not selected.

Upon receipt of the control word, and assuming the address is correctly selected, the control bits are loaded into the command and status register 60 and functions are performed. These functions include activating drivers 62 for the LED's 23, 24, 36, 46; and the driver for the solenoid 59 of door 19, and the like. Sensors such as photodetector 37 and the sensors 18 for the door 19, are also coupled to the command and status register 60 to provide status information to the bin electronics 59. Status information is loaded to the command and status register 60 continuously. Therefore, when interrogated, the command and status register 60 yields information concerning the active control function and the status of sensors 18, 37 and drivers 62.

The item presence detector which includes, the light source 36, and the photodetector 37, continuously monitors the bin 21 to detect the presence of an article 30 and updates the command and status register 60 in real time. The module control board 69 is responsible for polling each of the bin electronics 59 on a regular basis for this information.

The driver 62 which operates the door solenoid is activated upon receipt of the proper command in the control word and a correct bin address. Storage is provided so that this command remains active until disabled. The door status information which is preferably provided by two sensors 18 is continously updated in the command and status register 60. The door status information comes from the door sensors 18 which indicate whether the door is closed or full open. The absence of a signal from either of these sensors 18 indicates that the door is only partially opened.

The operator indicators 23, 24 are placed on the tray 22 to give the operator positive feedback on operations. They may be turned on or off via software control through the control bus. A particular bin 21 may be addressed and the proper control word sent to the bin electronics 59 to activate these indicators 23, 24.

Figure 8:
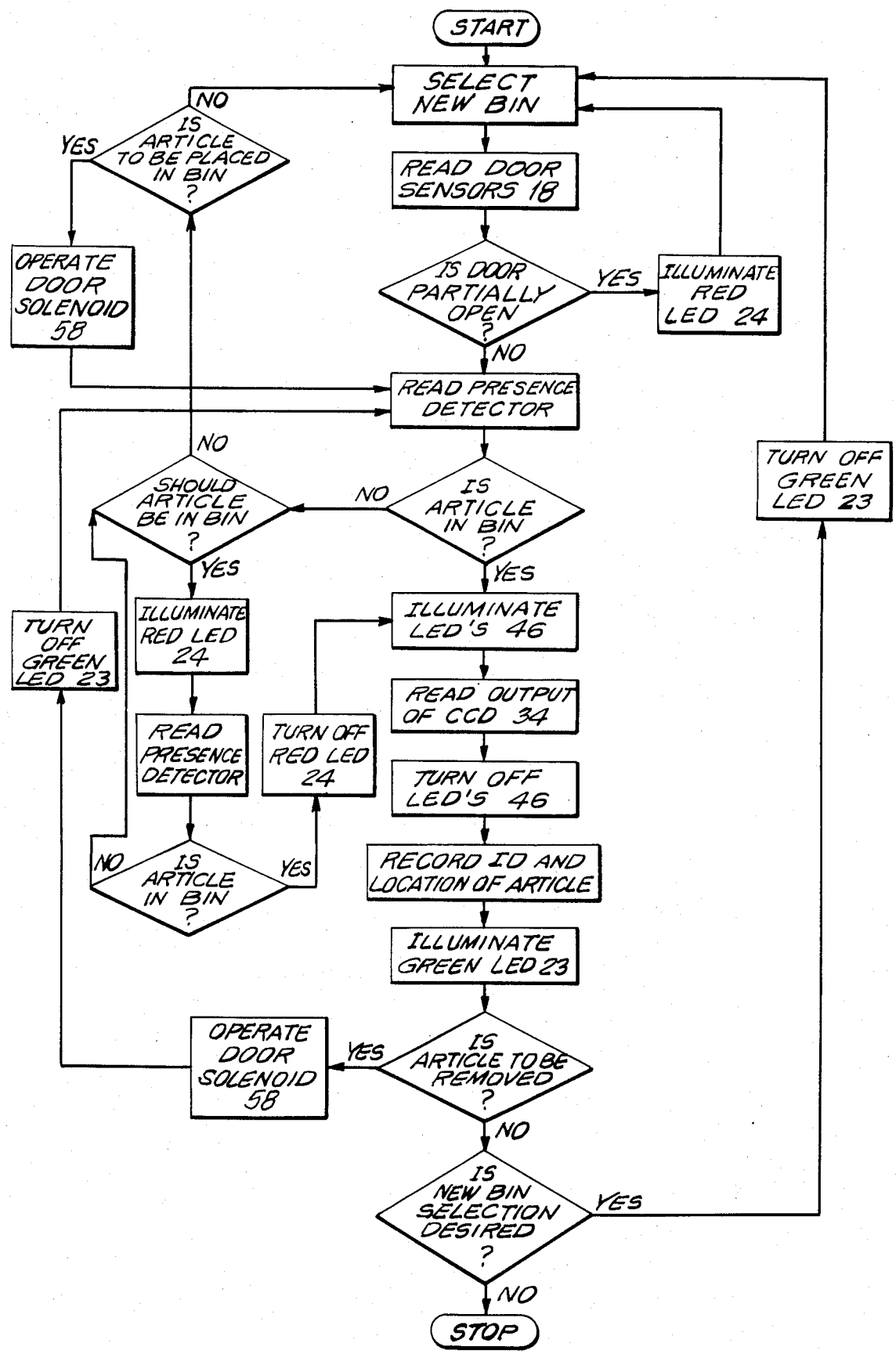
FIG. 8 is a represesentative flow diagram of software for a microprocessor associated with the control of the present invention.

The software interface to the bin electronics 59 is through the module control board 69. A representative example of a flow chart of the software associated with the microprocessor of the module control board 69 is provided in FIG. 8. The electrical interface between the bin electronics 59 and the rest of an automated system is also through the module control board 69. Preferably a flat cable is used to connect the bin electronics 59 in tray 22 to the module control board 69. The cable would be fanned out at the module or collection of bins 21 to accommodate the bin electronics 59 in trays 22. The power required for the bin electronics 59 is cabled separately and comes from the system power supplies.

While the invention has been described in its preferred embodiments it is to be understood that the words which have been used are words of description, rather than limitation, and that changes may be made within the purview of the appended claims without departing from the true scope and spirit of the invention in its broader aspects.

We claim:

1. An apparatus for storing and identifying coded articles placed therein, said code being a visually perceptible bar code and providing an indication of the identity of said articles, said apparatus comprising:
   at least one bin which is adapted to store the coded articles;
   presence detecting means disposed in each said at least one bin for detecting the presence of said coded article in said at least one bin;
   code reading means disposed in each said at least one bin for reading the bar code disposed on the coded article; and
   circuit means coupled to said presence detecting means and said code reading means for providing an indication of the identity and presence of the coded article in said at least one bin.

2. An apparatus according to claim 1 wherein said code reading means includes an optical code reader having a light source to illuminate said bar code disposed on the article placed in the bin.

3. An apparatus according to claim 2 wherein said code reading means further includes a light source, means for forming an image of said bar code, and a device to convert said image of the bar code to an electrical signal.

4. An apparatus according to claim 3 wherein said bin includes a transparent portion through which the light source illuminates the bar code.

5. An apparatus according to claim 4 wherein said optical code reader includes a light emitting diode as the light source.

6. An apparatus according to claim 5 wherein said optical code reader further includes means for reflecting the image of said bar code on to said device.

7. An apparatus according to claim 6 wherein said optical code reader includes said means for forming an image, and wherein said means for forming an image is disposed between said device and said reflecting means and focuses said image of the bar code on said device.

8. An apparatus according to claim 1 wherein said presence detecting means includes a light source and a photodetector.

9. An apparatus according to claim 8 wherein said light source for the presence detector is a light emitting diode.

10. An apparatus according to claim 4 wherein said optical code reader is disposed upon a printed circuit board coupled to said tray.

11. An apparatus according to claim 1 wherein said circuit means includes first indicating means for indicating that said bin may be utilized and second indicating means for indicating that a fault is associated with said bin and said bin should not be utilized.

12. An apparatus according to claim 11 wherein said first and second indicating means include light emitting diodes.

13. An apparatus according to claim 1 wherein said bins are disposed upon a remotely controlled vehicle.

14. An apparatus according to claim 1 wherein said bins include doors, said doors being automatically opened and closed and including means for detecting the opened and closed positions of said door.

15. An apparatus according to claim 14 wherein said door further includes a solenoid for automatically opening and closing said door.

16. An apparatus according to claim 15 wherein said means for detecting the opened and closed position of said door includes sensors.

17. An apparatus for storing and identifying coded semiconductor wafer containers placed therein, said code being a visually perceptible bar code providing an indication of the identity of each of said semiconductor wafer containers, said apparatus comprising:
   at least one bin which is adapted to store the coded semiconductor wafer containers;
   presence detecting means disposed in each said at least one bin for detecting the presence of said coded semiconductor wafer container in each said at least one bin;
   code reading means disposed in each said at least one bin for reading the code disposed on said coded semiconductor wafer container; and
   circuit means coupled to said presence detecting means and said code reading for providing an indication of the identity and presence of the coded semiconductor wafer container in said at least one bin.

* * * * *